Figure 1:
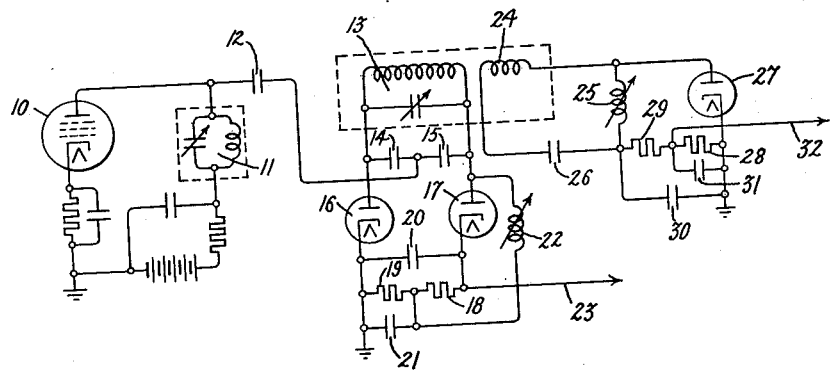

Jan. 4, 1944.  J. E. MAYNARD  2,338,526

FREQUENCY VARIATION RESPONSE NETWORK

Filed Jan. 17, 1941

Inventor:
John E. Maynard,
by Harry E. Dunham
His Attorney.

Patented Jan. 4, 1944

2,338,526

UNITED STATES PATENT OFFICE 2,338,526

FREQUENCY VARIATION RESPONSE NETWORK

John E. Maynard, Schenectady, N. Y., assignor to General Electric Company, a corporation of New York Application January 17, 1941, Serial No. 374,906

13 Claims. (Cl. 250—27)

My invention relates to frequency variation response networks, and more particularly to an improved type of network which may be easily constructed and adjusted for operation.

It is frequently desirable to utilize such a network, also known as a frequency discrimination network, to transform a deviation of frequency of a wave into a variation of voltage, the magnitude and polarity of the voltage corresponding respectively to the amount and direction of frequency deviation of the wave from a predetermined frequency. Such transformation may, for example, be desired to control the frequency of a wave radiated from a radio broadcast transmitter, or it may be utilized to demodulate a frequency modulated wave. Unless the device utilized for the transformation of the frequency deviation into signal voltage has a linear relation over a considerable range between deviation of the frequency of the wave from a predetermined frequency and the magnitude of the resulting voltage, the signal suffers undesirable distortion.

It is an object of my invention to provide such a network in which such relation between frequency deviation and voltage output is readily adjusted for maximum linearity, and whose efficiency of transformation of frequency deviation to voltage variation is high.

It is a further object of my invention to provide such a network whose construction is simple, and whose adjustment is facilitated by minimizing the interdependence of different circuit characteristics.

Such frequency variation response networks may include transformers in which it is necessary to provide mechanical adjustment of the magnetic coupling between primary and secondary. It is an additional object of my invention to provide such a network which does not include transformers or magnetic coupling and which, having minimum interdependence of different circuit characteristics, is readily adjustable.

Piezo-electric vibrators can be utilized in such networks for the determination therein of the predetermined frequency mentioned above. Such vibrators are desirable because of their great frequency stability under varying operating conditions. However, the reactance of such vibrators varies with great rapidity upon changes in frequency of impressed oscillations, and varies linearly only over very narrow ranges of frequency, thus restricting the range of frequency over which such vibrators may be used.

It is a further object of my invention to provide such a network including a piezo-electric vibrator in which the rate of variation of reactance with variation of frequency, while high, is lower than the rate produced by such a vibrator alone.

The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 illustrates one embodiment of my invention and Fig. 2 is a modification thereof.

Figure 2:
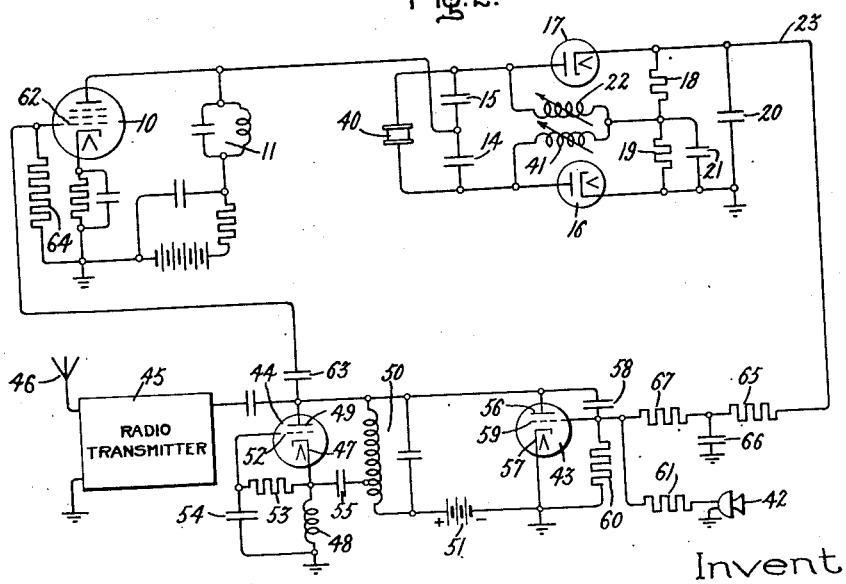

In Fig. 1 an electron discharge amplifier 10 is illustrated as connected to impress high frequency oscillations of constant intensity across a tuned circuit 11. The device 10 and the tuned circuit 11 may, for example, be part of the last or limiter stage of high frequency amplification in a radio receiver adapted to receive frequency modulated waves. The high frequency wave across the tuned circuit 11 is transmitted through a coupling condenser 12 to an intermediate point of a tuned circuit 13 through a pair of condensers 14 and 15, serially connected across the tuned circuit 13. One terminal of the tuned circuit 13 is connected through the anode-to-cathode path of a diode rectifier 16 to ground. The other terminal of the tuned circuit 13 is connected through the anode-to-cathode path of a second diode rectifier 17, and through a pair of load resistances 18 and 19 in series to ground. The rectifiers 16 and 17 are so poled that they transmit rectified current through the load resistances 18 and 19 in opposite directions.

A condenser 20 is connected in shunt to the resistances 18 and 19, and a second condenser 21 is connected in shunt to the resistance 19. These two condensers are of low impedance at the frequency to which the circuit 13 is tuned, and, therefore, by-pass current of such frequency around the respective resistances.

An adjustable inductance 22 is connected from a point between the tuned circuit 13 and the rectifier 17 to a point between the resistances 18 and 19. This inductance 22 provides a path through which direct current may flow upon rectification in the diode rectifiers 16 and 17. A conductor 23 is connected from a point between the rectifier 17 and resistance 18 to suitable utilization apparatus and impresses the voltage across resistances 18 and 19 upon such apparatus. The apparatus may, for example, be a signal reproducing system or may be indicating means to indicate the frequency deviations of the wave from the tuned circuit 11 from a predetermined frequency.

The frequency variation response network including the tuned circuit 13, condensers 14 and 15, and rectifiers 16 and 17 is arranged as a bridge circuit in which two adjacent arms are formed by the condensers 14 and 15, the two opposite arms are formed by the impedances presented by the rectifiers 16 and 17, and a diagonal is formed by the tuned circuit 13. Since the condenser 20 offers low impedance to the wave across the tuned circuit 11, the cathodes of the diode rectifiers 16 and 17 are effectively connected together for high frequencies to complete the bridge circuit. Without provision of means to unbalance this bridge and assuming that rectifiers 16 and 17 are alike and that condensers 14 and 15 are of approximately equal capacity, the bridge would be balanced and the tuned circuit 13 could never be excited from device 10.

The inductance 22 forms means to unbalance the bridge and allow excitation of the tuned circuit 13. When the bridge is so unbalanced, the wave from the tuned circuit 11, which wave is impressed across that diagonal of the bridge lying between ground and the point between the condensers 14 and 15, excites the tuned circuit 13 which forms the other diagonal of the bridge. The tuned circuit 13 is resonant at the predetermined frequency from which frequency deviations of the wave from the tuned circuit 11 are to be measured.

The inductance 22 performs another function besides producing unbalance of the bridge. The capacitance of the diodes 16 and 17 is small, so that their reactance is high at the frequency of the wave from the tuned circuit 11, whereby a substantial voltage appears across each of the diodes. The inductance 22 is so adjusted as to resonate with the capacity of the diode 17 at a frequency somewhere near the frequency of the wave from the tuned circuit 11, and correspondingly the effective impedance through the diode 17 is even higher than the reactance through the diode 16, whereby even higher voltages may be developed across the diode 17 for more efficient rectification.

The tuned circuit 13 is reactively coupled to the tuned circuit 11 by reason of the unbalance of the bridge constituted by condensers 14 and 15 and diode rectifiers 16 and 17. A tuned circuit reactively coupled to a source of voltage, whose frequency is that to which the circuit is tuned, has a voltage across its terminals which is at a 90 degree phase with respect to the voltage of the source. The tuned circuit 13 is coupled to the diode rectifiers 16 and 17 in balanced or push-pull relation. When a wave excites the network and is of the same frequency as that to which the circuit 13 is tuned, the circuit 13 oscillates and applies a voltage across diode 16 which is 90 degrees out of phase with the voltage across the tuned circuit 11, and applies a second voltage across diode 17, also 90 degrees out of phase with the voltage across the tuned circuit 11, and of opposite phase to the voltage applied to diode 16.

The condenser 14 and the diode 16 act as a capacitive voltage divider and apply across the diode 16 a voltage in phase with the voltage across the tuned circuit 11. Similarly, the condenser 15 and the diode 17 act as a capacitive voltage divider and apply voltage across diode 17 in phase with the input voltage. Thus, when the wave from the circuit 11 is of the same frequency as that to which the circuit 13 is resonant, two voltages in quarter phase relationship are applied to each of the diodes 16 and 17.

The diode 16 is provided with a load resistance 19 and the diode 17 is provided with a separate load resistance 18, across which each pair of these quarter phase voltage is respectively rectified. At the mid-frequency, that is, at the frequency to which the circuit 13 is resonant, the resultants of these two pairs of voltages across the respective diodes 16 and 17 are equal, and the rectified voltages across the load resistances 18 and 19 are equal. No voltage appears upon the output conductor 23.

As the frequency of the wave from the tuned circuit 11 is higher or lower than the mid-frequency to which the tuned circuit 13 is responsive, the voltage across the tuned circuit 13 varies from the above mentioned 90 degree relationship in one direction or the other. The two voltages across one of the diodes, therefore, become more nearly in phase, while the two voltages across the other diode become farther out of phase. The resultant voltage appearing across the one diode, therefore, becomes larger than the resultant voltage across the other diode. The rectified voltages across the load resistances 18 and 19 are consequently unequal, and a voltage of one polarity or the other, depending on the direction of deviation of the frequency from the tuned circuit 11 from the mid-frequency, appears on the output conductor 23.

Viewed in another way, the unbalance of the bridge effectively divides the tuned input circuit into two unequal parts, so that one of the parts is resonant above a mid-frequency of operation of the network, and the other part is resonant below that mid-frequency. The difference in characteristics of the two parts is such as to present different types of reactance to oscillations from the input, and hence such oscillations reach the respective diode rectifiers 16 and 17 in different phase.

The inductance 22 may be so adjusted, while maintaining its proper relationship with the remainder of the network as described previously, that there is a linear relation over a wide range between frequency deviation of the wave from the tuned circuit 11 from the mid-frequency and voltage developed on the output conductor 23. The adjustment of linearity by the adjustment of the inductance 22 is associated with adjustment of the unbalance of the bridge by the inductance, which is in effect an adjustment of the reactive coupling between the tuned circuits 11 and 13.

The frequency variation response network herein disclosed is useful in a receiver designed to detect amplitude variations of a received wave, as well as frequency variations. To this end, a coil 24 is inductively coupled to the tuned circuit 13 and is connected in series with an inductance 25 and a condenser 26. The circuit 24, 25, 26 is tuned to the frequency of an amplitude modulated wave appearing across the tuned circuit 11. A diode rectifier 27 is connected through load resistances 28 and 29 across the adjustable inductance 25. A condenser 30 is connected in shunt to the resistances 28 and 29, and a condenser 31 is connected in shunt to the resistance 28 to by-pass high frequency current therearound. A voltage appears across the resistance 28 which corresponds to the audio modulation of the wave from the tuned circuit 11. The voltage across the resistance 28 is transmitted to a suitable utilization circuit, such as an audio reproducer, through a conductor 32.

The condensers 14 and 15 may, if desired, be utilized to insulate tuned circuit 13 and the rectifiers 16 and 17 from the anode voltage of the device 10. In that case the coupling condenser 12 can be eliminated. The amount of coupling if condenser 12 is used is dependent on its size, and in any case the coupling depends on the sizes of the condensers 14 and 15, which may be made unequal to unbalance the bridge and increase coupling. Similarly, diodes 16 and 17 may be made to have different impedances by means other than inductance 22, such, for example, as by using diodes of different size.

In Fig. 2 there is illustrated a modification of my invention in which certain elements correspond to similar elements in Fig. 1 and are given like reference characters. A piezo-electric, or quartz crystal, vibrator 40 is connected in shunt to the condensers 14 and 15 in place of the tuned circuit 13. The coupling condenser 12 is omitted and insulation from the anode voltage of the device 10 is provided by the condensers 14 and 15. In this modification the adjustable inductance 22 provides a path for rectified current only for the diode 17. A second adjustable inductance 41 is connected from a point between the rectifier 16 and the condenser 14 to a point between the resistances 18 and 19 to provide a path for rectified current flowing in the diode rectifier 16.

The adjustment of the frequency variation response network including the vibrator 40 is similar to the adjustment of the network including the tuned circuit 13. Unbalance of the bridge formed by the condensers 14 and 15 and the diodes 16 and 17 is effected by adjustment of one or both of the inductances 22 and 41. The theory of operation of the device is, in general, similar to that explained in connection with the device illustrated by Fig. 1.

It is usual practice to operate a piezo-electric vibrator at such a frequency that it exhibits parallel resonance characteristics. Under such conditions of operation of the vibrator 40, the network can be made to respond linearly to frequency shift of the wave impressed thereon only over a relatively small range. The range may, for example, be 20 cycles when the vibrator 40 is resonant at 455 kilocycles. The network responds very rapidly to frequency shift within this limited range, and provides an output voltage highly sensitive to frequency change of the input wave.

The inductances 22 and 41 may be replaced by resistances, if desired, to provide paths for the rectified current from the diodes 16 and 17. It is preferred to use the inductances in most cases and to adjust them near resonance with the internal capacity respectively of the diodes 16 and 17 when they form a parallel tuned circuit.

The vibrator 40 may alternatively be operated at such a frequency that it exhibits series resonant characteristics. By operation of the vibrator 40 at series resonance, it is meant that the vibrator is operated at such a frequency (usually near the frequency at which it operates at parallel resonance) that its reactance over a certain range of frequencies varies oppositely to the reactance of a parallel tuned circuit in that range.

The reactance of a parallel tuned circuit decreases as the frequency of impressed oscillations increases from an inductive value to zero at the frequency at which resonance occurs. As the frequency of the oscillations increases further beyond the resonant frequency of the circuit, the reactance of the circuit becomes increasingly capacitive.

A piezo-electric vibrator operating in the range where it exhibits series resonant characteristics operates quite differently. As the frequency of impressed oscillations increases from a point at which the vibrator has capacitive reactance in this range, the reactance decreases and becomes zero at a frequency called the series resonant frequency of the vibrator. As the frequency is further increased, the reactance becomes increasingly inductive.

It is by properly combining such characteristics of these two devices, by placing them in shunt to each other, that I provide a desirable form of frequency variation response network. It is, of course, within the scope of my invention to utilize a piezo-electric vibrator operated in the range where it exhibits parallel characteristics, and to combine with it a series resonant circuit. In such case the overall reactance of the network varies oppositely upon a change in frequency from the network herein described.

The network including a piezo-electric vibrator and a tuned circuit, when so adjusted, provides discriminator operation over a somewhat broader range of frequencies than if the vibrator 40 were utilized alone or with tuned circuits differently adjusted. In one case, for example, the vibrator 40 operated at 450 kilocycles, exhibiting series resonant characteristics, and a linear characteristic was obtained in which the oscillations from the tuned circuit 11 changed in frequency by 600 cycles to produce a corresponding change in voltage across the resistances 18 and 19.

To adjust the network, the vibrator is first removed from its holder and the inductances 22 and 41 are adjusted, as explained previously in connection with the adjustment of inductance 22 in the diagram of Fig. 1, to produce proper discriminator action of the network. This discriminator action is linear over a relatively broad range of frequencies, and linearity, as well as other characteristics, may be adjusted by the inductances 22 and 41, or by other circuit changes to unbalance the bridge formed by the network. The network is preferably adjusted to provide such discriminator action over a range within which the output voltage is zero at the same frequency as the frequency at which the impedance of the vibrator 40 is a minimum.

When the vibrator 40 is replaced in its holder the discriminator action is reversed. That is, for a frequency below mid-frequency, or the frequency at which zero voltage appears on the output, the output voltage will be opposite in polarity to that obtained before the vibrator 40 was reinserted in its holder. The same effect may be observed at frequencies higher than this mid-frequency.

Since the network exhibits a characteristic relation between output voltage and frequency of the input oscillations which is the resultant of the action of the network without the vibrator 40 and the action of the vibrator itself, adjustment of the various circuit elements of the network may be utilized to control the over-all discriminator action of the network. For example, the width of the frequency band over which the network operates linearly, and to some extent the rapidity of change of output voltage with change in frequency of input oscillations, may be controlled by adjustment of the discriminator action of the network separately from the vibrator 40.

If the network be properly adjusted without the vibrator 40 in place to produce zero voltage output at the same frequency as that at which the vibrator 40 exhibits minimum impedance, the network as a whole produces zero voltage at this same frequency, and the frequency at which the zero voltage output is produced is substantially independent of circuit changes but depends only on the characteristics of the vibrator 40 itself.

The frequency response network may be used to provide frequency control of a frequency modulated wave transmitter. As illustrated in Fig. 2 such a transmitter includes a microphone 42, an electron discharge device 43 so connected in a circuit as to simulate a reactance whose magnitude is adjustable in accordance with the intensity of signals from the microphone 42, an oscillating electron discharge device 44, a radio transmitter 45 including power amplifiers, and an antenna 46. The cathode 47 of the device 44 is connected through an inductance 48 to ground while the anode 49 is connected through a tuned circuit 50 and a source 51 of potential to ground. The control grid 52 of the device 44 is connected through a resistance 53 to the cathode 47, and through a condenser 54 to ground. The cathode 47 is coupled through a coupling condenser 55 to an intermediate point of the tuned circuit 50. So connected, the electron discharge device 44 maintains oscillations in the tuned circuit 50 at the frequency at which it is resonant.

The anode 56 of the device 43 is connected to the anode 49 of the device 44, while the cathode 57 of the device 43 is connected to ground. A condenser 58 is connected between the anode 56 and the control electrode 59 of the device 43, while a resistance 60 is connected between the control electrode 59 and the cathode 57. So connected the device 43 simulates a condenser in shunt to the tuned circuit 50, and accordingly modifies the frequency to which the circuit 50 is resonant.

The microphone 42 in series with a resistance 61 is connected in shunt to the resistance 60 to change the bias potential for the device 43. As the bias potential across the resistance 60 is changed, the amount of current drawn by the device 43 changes and the value of the condenser which it simulates correspondingly changes. The oscillations produced by the device 44 therefore have a frequency which corresponds to the intensity of the signals from the microphone 42.

The stability of the midfrequency of the wave from the antenna 46 depends on the stability of the frequency to which the tuned circuit 50 is resonant, which is in turn dependent upon the possibility of change in the components of the tuned circuit 50 and of the circuits associated with the device 43. The frequency variation response network including the vibrator 40 is useful to produce an average bias voltage across the resistance 60 of such value as to maintain the frequency of oscillation of the device 44 constant over long periods.

To accomplish this control of average frequency, the control electrode 62 of the device 10 is coupled through a coupling condenser 63 to the anode 49 of the device 44. A resistance 64 is connected between the control electrode 62 and ground. The output conductor 23 of the control network is connected serially through a resistance 65 and a filter condenser 66 to ground. The filter formed by the resistance 65 and the condenser 66 has a sufficiently long time constant so that voltage across condenser 66 does not change appreciably during changes of the frequency of the wave from device 44 caused by signals from the microphone 42. A resistance 67 is connected from the control electrode 59 of the device 43 to a point between the condenser 66 and the resistance 65.

When there is no signal from the microphone 42, and assuming that the frequency of oscillation of the device 44 is exactly at the frequency to which the vibrator 40 is resonant, the wave from the device 44 is transmitted through the device 10 for the control network. Since the vibrator 40 is exactly resonant to the wave, substantially no net voltage is produced across the resistances 18 and 19. No correcting bias voltage is, therefore, applied through resistances 65 and 67 to the control electrode 59 of the device 43.

Now if, for some reason, the frequency of the oscillations from the device 44 drifts to a higher or lower value, the wave from the device 44 applied to the vibrator 40 will be impressed in different values across the diodes 16 and 17, so that a net voltage appears across the resistances 18 and 19. The polarity and magnitude of the net voltage across the two resistances depends on the direction and amount of frequency deviation of the wave from the device 44 from the midfrequency, that is, from the frequency to which the vibrator 40 is resonant. The voltage across the resistances 18 and 19 is applied through the resistances 65 and 67 to the control electrode 59 of the device 43, and correspondingly increases or decreases the current therethrough in the direction necessary to decrease or increase the frequency of oscillation of the device 44, as is necessary to maintain it constant.

If signals are impressed on the device 43 from the microphone 42 the transient frequency variations of the wave from the device 44 applied through the device 10 to the vibrator 40 produce transient voltage variations across the resistances 18 and 19. These transient voltage variations are filtered out by the resistance 65 and the condenser 66 and do not influence the device 43 appreciably.

The present invention is, of course, not limited to the uses described, since the invention is useful for other purposes. It may be used, as illustrated, to demodulate a frequency modulated wave, or to control the mean frequency of a frequency modulated wave transmitter, as well as for providing automatic frequency control in a receiver, or for the measurement of the frequency of a wave, or for other uses obvious to those skilled in the art.

It is within the scope of my invention to unbalance the bridge by other means than by inductances 22 and 41 or by condensers 14 and 15, as, for example, by connecting condenser 12 in Fig. 1 to an intermediate point of the inductance of tuned circuit 13 nearer to one diode than the other.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A frequency variation response network comprising a piezo-electric vibrator and a tuned circuit in shunt thereto, said vibrator and circuit exhibiting oppositely varying reactances over the range of frequencies in which said network operates, means to rectify voltages across said vibrator and circuit, means to compare said rectified voltages, said rectifying and comparing means having impedance, and means to impress oscillations on said network across such impedance between said comparing means and an intermediate point of said vibrator and circuit.

2. A frequency discriminator network comprising a parallel resonant circuit having terminals, a single input connection to said circuit at a point electrically between said terminals thereof, an impedance connected across said circuit, means for supplying oscillatory energy to said network through a circuit including said single input connection and a point between two portions of said impedance, and means for unbalancing said network with respect to said energy supplying means whereby a greater voltage appears across one portion of said impedance than across the other when the frequency of said energy deviates from the frequency of said resonant circuit.

3. In combination in a frequency discriminator network, an input circuit resonant at a single frequency, an output circuit, said input circuit having an intermediate point, means for impressing input signals between said output circuit and said intermediate point, said means being the only input to said network, and means for unbalancing the portions of said resonant input circuit on either side of said intermediate point.

4. A bridge circuit comprising four arms, means to resonate two adjacent arms of said bridge at a single predetermined frequency, means to unbalance said bridge, means to impress a wave on a diagonal of said bridge lying between said two adjacent arms, means to rectify the currents flowing in the two remaining arms of said bridge, and means to add the rectified currents in opposed relation, the magnitude and polarity of the added rectified currents being indicative of the relative magnitudes of the frequency of said wave and said single predetermined frequency.

5. A frequency responsive bridge having four reactive arms, a circuit resonant at a single predetermined frequency connected across one diagonal of said bridge, means for impressing a wave across the other diagonal of said bridge, means for unbalancing said bridge over a range of frequencies including the frequency of said wave and said predetermined frequency, means for rectifying the wave in two arms of said bridge, and means responsive to the difference between the rectified currents in said arms for producing a unidirectional voltage whose magnitude and polarity are determined by the relative magnitudes of said frequencies.

6. A frequency modulation detector comprising a pair of rectifiers having an output circuit, a circuit resonant at a single frequency and connected between said rectifiers on the input side thereof, said resonant circuit having terminals, and a signal input circuit connected between a point electrically intermediate the terminals of said resonant circuit and said output circuit affording the only signal input path for said network.

7. A frequency modulation detector comprising a pair of rectifiers having an output circuit, a pair of capacity elements serially connected between said rectifiers on the input side thereof, shunt inductance tuning means for said capacity elements providing a tuned input circuit resonant at a single frequency, and a signal input circuit connected between the junction of said capacity elements and said output circuit affording the only signal input path for said network.

8. A frequency discriminator network comprising a circuit resonant at a single frequency, said circuit having terminals, a rectifier connected to each of the terminals of said circuit, an output circuit for said rectifiers comprising two substantially equal output impedance elements serially connected between said rectifiers, and a tuned input circuit having a connection to a point electrically between the terminals of said resonant circuit and a second connection to said output impedances, said connections forming the only signal input means for said network.

9. A network for producing a voltage whose magnitude and polarity correspond respectively to the amount and direction of deviation of the frequency of a wave from a predetermined frequency, said network comprising a bridge having four arms formed in order by a pair of condensers and a pair of rectifiers, one diagonal of said bridge being adapted to be energized by said wave and the other diagonal being resonant at said predetermined frequency, means to unbalance said bridge whereby said resonant diagonal may be excited by said wave, so that different voltages appear across said rectifiers when the frequency of said wave differs from said predetermined frequency, and an output circuit responsive to the difference in rectified currents flowing through said rectifiers.

10. A frequency modulation detector comprising an oscillatory device having a resonant frequency, a pair of impedances serially connected across at least a portion of said device, a source of oscillations variable in frequency through said resonant frequency connected between two points, one point being electrically intermediate the two connections between the respective impedances and said device and the other point being between said impedances, and means to unbalance said device and said impedances with respect to said source sufficiently to cause said device to oscillate by reason of said unbalance, whereby two components of oscillatory voltage are applied to each impedance, one comprising a portion of the voltage of said source and the other comprising the voltage of a respective portion of said device excited therein by reason of said unbalance, said two components being displaced in phase by a predetermined amount when said source voltage has a frequency equal to said resonant frequency, and the phase relation between the two components on one impedance varying oppositely to the phase relation between the two components on the other impedance in response to a change in frequency of the voltage of said source.

11. A frequency modulation detector comprising an oscillatory device having a resonant frequency, a pair of rectifiers having substantial impedance at said frequency serially connected across at least a portion of said device, a source of oscillations variable in frequency through said resonant frequency connected between two points, one point being electrically intermediate the connections between said rectifiers and said device and the other point being between said rectifiers, means to unbalance said device and said rectifiers with respect to said source sufficiently to cause said device to oscillate by reason of said unbalance, whereby two components of oscillatory voltage are applied to each rectifier, one comprising a portion of the voltage of said source and the other comprising the voltage of a respective portion of said device excited therein by reason of said unbalance, said two components being displaced in phase by a predetermined amount when said source voltage has a frequency equal to said resonant frequency, and the phase relation between the two components on one rectifier varying oppositely to the phase relation between the two components on the other rectifier in response to a change in frequency of the voltage of said source, and means for comparing the rectified currents in said rectifiers to provide a measure of the frequency of the voltage of said source.

12. A conversion and detection system for frequency modulated waves comprising a source of signal oscillations, means for deriving across points of opposite instantaneous polarity of said tuned circuit an alternating potential in substantially quadrature relation with said signal oscillations, said means comprising a parallel tuned circuit capacitively coupled to said source, means for supplying said signal oscillations to substantially the electrical mid-point of said circuit thereby to impress upon said points of opposite instantaneous polarity an alternating potential in substantially co-phasal relation with said signal oscillations, a pair of rectifiers connected to said points of opposite instantaneous polarity of said tuned circuit, and means for combining the outputs of said rectifiers in opposition to detect frequency modulation of said signal oscillations.

13. A conversion and detection system for frequency modulated waves comprising a source of signal oscillations, means for deriving across points of opposite instantaneous polarity of said tuned circuit an alternating potential in substantially quadrature relation with said signal oscillations, said means comprising a parallel tuned circuit capacitively coupled to said source, a variable impedance device arranged to control the capacitive coupling of said tuned circuit to said source, means for supplying said signal oscillations to substantially the electrical mid-point of said tuned circuit thereby to impress upon said points of opposite instantaneous polarity an alternating potential in substantially co-phasal relation with said signal oscillations, a pair of rectifiers connected to said points of opposite instantaneous polarity of said tuned circuit, and means for combining the outputs of said rectifiers in opposition to detect frequency modulation of said signal oscillations.

JOHN E. MAYNARD.